United States Patent
Kim et al.

(10) Patent No.: US 7,838,581 B2
(45) Date of Patent: Nov. 23, 2010

(54) POLYPROPYLENE RESIN COMPOSITION FOR INTERIOR MATERIALS OF VEHICLE

(75) Inventors: Jae Hong Kim, Daegu (KR); Yun Jong Jeon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 130 days.

(21) Appl. No.: 12/006,144

(22) Filed: Dec. 31, 2007

(65) Prior Publication Data

US 2009/0137708 A1 May 28, 2009

(30) Foreign Application Priority Data

Nov. 26, 2007 (KR) .................. 10-2007-0121152

(51) Int. Cl.
*C08L 53/00* (2006.01)
(52) U.S. Cl. .................. 524/140; 524/505; 524/451; 524/423; 524/427; 524/456; 524/383; 524/400; 524/432; 524/399
(58) Field of Classification Search .............. 524/140, 524/505, 451, 423, 427, 456, 383, 400, 432, 524/399
See application file for complete search history.

(56) References Cited

U.S. PATENT DOCUMENTS

2004/0116605 A1* 6/2004 Nishihara et al. ........... 525/192
2006/0189759 A1 8/2006 Walther et al.

FOREIGN PATENT DOCUMENTS

JP 09-048889 2/1997
JP 2001-214014 8/2001

* cited by examiner

*Primary Examiner*—Robert D. Harlan
(74) *Attorney, Agent, or Firm*—Edwards Angell Palmer & Dodge LLP; Peter F. Corless

(57) ABSTRACT

The present invention relates to a polypropylene resin composition, more particularly to a composition comprising an ethylene/propylene block copolymer, an ethylene/α-olefin copolymer rubber, a styrene-based polymer rubber, a polypropylene-silicone rubber master batch, a magnesium compound and an inorganic filler.

The polypropylene resin composition of the present invention exhibits superior rigidity, scratch resistance and glossiness, outstanding laser processability and low-temperature impact resistance, and also superior fluidity. Therefore, it is applicable to manufacture interior materials of a vehicle such as an instrument panel. Especially, the present invention is suitable to manufacture an air bag deployable instrument panel assembly requiring no coating.

17 Claims, No Drawings

POLYPROPYLENE RESIN COMPOSITION FOR INTERIOR MATERIALS OF VEHICLE

CROSS-REFERENCE TO RELATED APPLICATION

This application claims the benefit under 35 U.S.C. §119(a) of Korean Patent Application No. 10-2007-0121152, filed on Nov. 26, 2007, the entire contents of which are incorporated herein by reference.

BACKGROUND

1. Technical Field

The present invention relates to a polypropylene resin composition with superior rigidity, scratch resistance and glossiness, laser processability, low temperature impact resistance and fluidity suitable for interior materials of a vehicle, including an air bag deployable instrument panel.

2. Background Art

Being superior in molding property, impact resistance, chemical resistance, specific gravity and cost, polypropylene composite resins have been widely used for manufacturing interior and exterior materials of vehicles. Especially, they are suitable to be used in parts where safety and functionality are of significance, for example, as an instrument panel. However, although the polypropylene resin compositions developed thus far are superior in physical properties such as rigidity, scratch resistance, impact resistance, etc., the fluidity tends to decrease reversely proportional to the physical properties. As a result, it is still difficult to use them to manufacture thin, lightweight parts, and also problems such as poor surface appearance or scratches may occur. And, if the fluidity of the resin is increased, the impact resistance decreases and there is a possibility of breaking into pieces when an accident occurs. Besides, the decreased rigidity of the molded part makes the assembly with other parts difficult due to deformation and warpage.

Several types of polypropylene-based resin compositions for interior materials of a vehicle have been developed. For example, Korean Patent No. 10-0263332 discloses a resin composition having superior physical properties including rigidity and/or capable of being directly coated with paint without primer treatment. Korean Patent No. 10-0412452 discloses a resin composition for an air bag deployable instrument panel which can be directly coated with paint without primer treatment. Korean Patent Application No. 2005-72514 discloses a polypropylene resin composition for interior materials of a vehicle having improved scratch resistance and molding property. However, since impact resistance, scratch resistance, impact resistance or rigidity are contradictory to fluidity property, there has been no resin composition suitable for an instrument panel which is required to meet both properties.

For example, although the resin composition for an air bag deployable instrument panel (Korean Patent No. 10-0412452) provides excellent rigidity and coatability and has superior low-temperature impact resistance required for the inflating of the air bag, it has appearance problems such as weld line, sink, flow mark, etc. due to low fluidity and requires coating due to insufficient scratch resistance.

Accordingly, there is a need for the development of a polypropylene resin composition having physical properties enough to eliminate the coating process for cost reduction, as well as high fluidity, superior scratch resistance, and low-temperature impact resistance required for the inflating of the air bag.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present inventors have conducted extensive researches to solve the aforesaid problems and meet the needs of the industry. As a result, they have developed a resin composition that can overcome the contradicting properties of fluidity and other physical properties such as impact resistance, scratch resistance, impact resistance and rigidity. The resin composition of the present invention can be applied for interior materials of a vehicle, especially for an instrument panel, without requiring a coating process.

In one aspect, the present invention provides a polypropylene resin composition for interior materials of a vehicle comprising 30 to 70 weight % of an ethylene/propylene block copolymer, 10 to 30 weight % of an ethylene/α-olefin copolymer rubber, 1 to 10 weight % of a styrene-based polymer rubber, 2 to 8 weight % of a polypropylene-silicone rubber master batch, 1 to 7 weight % of a magnesium compound and 10 to 40 weight % of an inorganic filler.

In a preferred embodiment, the ethylene/propylene block copolymer has a melt index of 20 to 50 g/10 min and an ethylene content of 3 to 20 weight %.

In another preferred embodiment, the ethylene/α-olefin copolymer rubber is selected from an ethylene/propylene copolymer (EPR), an ethylene/butene-1 copolymer (EBM), an ethylene octene-1 copolymer (EOM) and a combination thereof.

In still another preferred embodiment, the ethylene/α-olefin copolymer rubber comprises 20 to 80 weight % of an ethylene/propylene copolymer, 12 to 25 weight % of an ethylene/butene-1 copolymer and 15 to 45 weight % of an ethylene octene-1 copolymer, based on the total weight of the ethylene/α-olefin copolymer rubber.

In yet another preferred embodiment, the styrene-based polymer rubber is linear or non-linear and at least 97 to 99.8% of the unsaturated bonds are hydrogenated. Preferably, the styrene-based polymer rubber comprises 10 to 50 weight % of a styrene block polymer, and 50 to 90 weight % of either a block homopolymer of a monomer selected from the group consisting of ethylene, isoprene, butylene, butadiene and propylene or a block copolymer of two or more monomers selected from the group consisting of ethylene, isoprene, butylene, butadiene and propylene.

In still yet another preferred embodiment, the polypropylene-silicone rubber master batch comprises polypropylene resin and silicone rubber in weight ratio of 1:0.5 to 1.5. Suitably, the polypropylene resin has an average molecular weight of 35,000 to 40,000, a melt index of 25 to 40 g/10 min (at 190° C., 2.6 kgf) and an intrinsic viscosity of 1.1 to 1.2 dL/g, and the silicone rubber is a siloxane-based silicone rubber having an average molecular weight of 80,000 to 100,000 and a specific gravity of 0.95 to 0.98. Also suitably, the silicone rubber comprises polydimethylsiloxane, at least one of methyl groups thereof being substituted with vinyl groups or phenyl groups. For example, it may comprise at least one compound selected from the group consisting of polymethylphenylsiloxane, polymethylvinylsiloxane, polydiphenylsiloxane, polydivinylsiloxane, polyphenylvinylsiloxane, and a mixture thereof. It may, preferably, further comprise an oil component.

In a further preferred embodiment, the magnesium compound comprises 30 weight % of magnesium hydroxide and 70 weight % of magnesium sulfate and is in the form of a single-crystal fiber having an average diameter of 0.1 to 1.0 µm and an average length of 10 to 80 µm.

In a still further preferred embodiment, the inorganic filler is at least one selected from the group consisting of talc, barium sulfate, calcium carbonate and wollastonite having an average particle size of 0.5 to 7 µm.

Preferably, the polypropylene resin composition according to the present invention has a melt index of 10 to 50 g/10 min.

Suitably, the polypropylene resin composition according to the present invention is formed by injection molding.

The present polypropylene resin compositions may further comprise at least one antioxidant selected from the group consisting of a phenol-based antioxidant, a phosphite-based antioxidant and a thiodipropionate synergist.

Also, the present polypropylene resin compositions may comprise at least one neutralizing agent selected from the group consisting of calcium stearate, zinc oxide and zinc stearate.

Further, the present polypropylene resin compositions may comprise an antistatic agent.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

Other aspects of the invention are discussed infra.

DETAILED DESCRIPTION

Hereinafter reference will now be made in detail to various embodiments of the present invention. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

As discussed above, the problem of the conventional polypropylene resin compositions is that when fluidity is good, the other physical properties are poor, and vice versa. The present inventors developed a polypropylene resin composition that has well-balanced physical properties and fluidity. When injection molded, the polypropylene resin composition of the present invention gives a vehicular interior material molding product with superior surface properties, particularly one applicable to be used in an instrument panel without requiring coating. An air bag can be deployed without special assembly, and the resultant molding product has significantly superior laser processability and low-temperature impact resistance.

In one aspect, the present invention provides a polypropylene resin composition comprising 30 to 70 weight % of an ethylene/propylene block copolymer, ethylene/10 to 30 weight % of an α-olefin copolymer rubber, 1 to 10 weight % of a styrene-based polymer rubber, 2 to 8 weight % of a polypropylene-silicone rubber master batch, 1 to 7 weight % of a magnesium compound and 10 to 40 weight % of an inorganic filler.

The ethylene/propylene block copolymer is a highly crystalline, high fluidity polypropylene composite and is a copolymer of ethylene and propylene. Preferably, ethylene may be comprised in 3 to 20 weight %, more preferably, in 5 to 15 weight %. Preferably, the ethylene/propylene block copolymer may have a melt index in the range from 20 g/10 min to 50 g/10 min at 230° C., more preferably, 25 to 40 g/10 min. When the ethylene content is below 3 weight %, the polypropylene resin composition may have reduced impact strength. And, when it exceeds 20 weight %, rigidity may decrease. And, when the ethylene/propylene block copolymer has a melt index below 10 g/10 min, fluidity may decrease, thereby resulting in appearance problems after molding such as weld line, sink, flow mark, etc. And, when it exceeds 50 g/10 min, rigidity and impact strength may be poor.

The ethylene/propylene block copolymer may be comprised in an amount of 30 to 70 weight %, more preferably 40 to 60 weight %, based on the total weight of the polypropylene resin composition. When the content is below 30 weight %, fluidity may decrease and, thereby, molding property may become poor. And, when it exceeds 70 weight %, it is difficult to balance rigidity and impact property. Hence, the aforesaid range is preferred.

The ethylene/α-olefin copolymer rubber is added to improve impact resistance by providing elasticity to the polypropylene resin composition. For the ethylene/α-olefin copolymer, normally one selected from an ethylene/propylene copolymer (EPR), an ethylene/butene-1 copolymer (EBM), an ethylene/octene-1 copolymer (EOM) and a combination thereof is used. The α-olefin content of the copolymer may be 20 to 80 weight % for an ethylene/propylene copolymer, 12 to 25 weight % for an ethylene/butene-1 copolymer, and 15 to 45 weight % for an ethylene octene-1 copolymer.

The ethylene/α-olefin copolymer rubber may be comprised in an amount of 10 to 30 weight %, more preferably 15 to 25 weight %, based on the total weight of the polypropylene resin composition. When the content exceeds 30 weight %, rigidity and molding property of the polypropylene resin composition may be poor. And, when it is below 10 weight %, impact strength may decrease.

The styrene-based polymer rubber is added to improve impact strength without deteriorating rigidity. It may include a block polymer of styrene or its derivatives, a block homopolymer of a monomer selected from ethylene, isoprene, butylene, butadiene, propylene and derivatives thereof, and a block copolymer of at two or more monomers selected from ethylene, isoprene, butylene, butadiene, propylene and derivatives thereof. Preferably, at least 95%, more preferably at least 97%, of the unsaturated bonds thereof are substituted with hydrogens. When less than 97% of the unsaturated bonds are substituted with hydrogens, impact strength of the polypropylene composition is not improved significantly and rigidity may decrease.

Normally, an a-b-a type linear or non-linear polymer rubber is used. In the a-b-a type linear or non-linear polymer rubber polymer rubber, a refers to a block polymer of styrene or its derivatives (referred to as "block polymer a" hereinafter), and b refers to a block homopolymer of a monomer selected from ethylene, propylene, butylene, butadiene, isoprene and derivatives thereof or a block copolymer of at two or more monomers selected from ethylene, propylene, butylene, butadiene, isoprene and derivatives thereof (referred to as "block polymer b" hereinafter). The block polymer a is comprised in an amount from 10 to 50 weight %, and the block polymer b is comprised in an amount from 50 to 90 weight %. The block polymer a improves rigidity of the resin composition, such as hardness, glossiness, tensile strength, and so forth, while the block polymer b improves compatibility with the olefin resin composition. When the block polymer a is comprised in less than 10 weight %, the polypropylene-based resin composition may have weak rigidity such as hardness. And, when it is comprised in excess of 50 weight %, compatibility with the olefin resin composition may decrease, thereby having adverse effect on impact strength.

The styrene-based polymer rubber may be comprised in an amount from 1 to 10 weight %, more preferably from 1.5 to 7 weight %, based on the total weight of the polypropylene resin composition. When it is comprised in excess of 10 weight %, glossiness, laser processability or rigidity of the polypropylene resin composition may be deteriorated. And, when it is comprised in less than 1 weight %, elongation and other physical properties may be deteriorated and improvement of impact strength may be insignificant.

The polypropylene-silicone rubber master batch is added to improve impact resistance and scratch resistance, and is capable of providing superior performance improvement even with a small amount. The polypropylene-silicone rubber master batch has a composition of polypropylene resin: silicone rubber=1:0.5 to 1.5, based on weight. For the silicone rubber, a siloxane-based silicone rubber, which has very superior heat resistance, cold resistance, weather resistance and ozone resistance, as well as impact resistance, and is extensively used in the whole industry, may be used. When the weight proportion of polypropylene resin: silicone rubber is below 1:0.5, the added amount of the polypropylene-silicone rubber master batch has to be increased, thereby leading to deterioration of rigidity or impact property. And, when it is above 1:1.5, dispersibility problem may occur during the preparation process of the polypropylene resin composition.

The polypropylene-silicone rubber master batch may comprise 50 weight % of a polypropylene resin having a molecular weight of from 35,000 to 40,000, a melt index of from 25 to 40 g/10 min (at 190° C., 2.6 kgf) and an intrinsic viscosity of from 1.1 to 1.2 dL/g, and 50 weight % of a siloxane-based silicone rubber having a molecular weight of from 80,000 to 100,000 and a specific gravity of from 0.95 to 0.98, based on the weight of the master batch. Also, the silicone rubber may comprise polydimethylsiloxane, at least one of methyl groups thereof being substituted with vinyl groups or phenyl groups. For example, it may comprise at least one compound selected from the group consisting of polymethylphenylsiloxane, polymethylvinylsiloxane, polydiphenylsiloxane, polydivinylsiloxane, polyphenylvinylsiloxane or a mixture thereof. It may further comprise an oil component.

The polypropylene-silicone rubber master batch may be comprised in an amount from 2 to 8 weight %, more preferably from 3 to 6 weight %, based on the total weight of the polypropylene resin composition. When the content is below 2 weight %, wear resistance and scratch resistance may be deteriorated. And, when it exceeds 8 weight %, overall physical properties may be deteriorated because of dispersibility problem.

The magnesium compound is added to improve rigidity. It may be a single-crystal fiber type magnesium compound comprising 30 weight % of magnesium hydroxide and 70 weight % of magnesium sulfate.

In an embodiment, rubber component is added for increasing fluidity and improving impact resistance in order to eliminate the need of coating, which weakens rigidity. Addition of the magnesium compound improves the rigidity significantly without deteriorating impact resistance. The magnesium compound used in the present invention may have an average diameter of from 0.1 to 1.0 μm and an average length of from 10 to 80 μm. Preferably, the magnesium compound may be comprised in 1 to 7 weight %, more preferably in 2 to 6 weight %, based on the total weight of the polypropylene resin composition. When the content is below 1 weight %, the effect of rigidity enhancement may not be attained. And, when it exceeds 7 weight %, impact resistance may decrease.

The inorganic filler may be talc, barium sulfate, calcium carbonate and wollastonite having an average particle size of from 0.5 to 7 μm. Particularly, talc is preferred in terms of dispersibility and physical properties. The inorganic filler may be comprised in 10 to 40 weight %, more preferably in 15 to 35 weight %, based on the total weight of the polypropylene resin composition. When the content is below 10 weight %, rigidity and heat resistance may be deteriorated. And, when it exceeds 40 weight %, impact strength and scratch resistance may be deteriorated.

The polypropylene resin composition of the present invention may further comprise any additive commercially available. Although the additive is not limited to a particular one, the additive may include, for example, an antioxidant, a neutralizing agent, antistatic agent, and a combination thereof. The antioxidant may be at least one selected from a phenol-based antioxidant, a phosphite-based antioxidant, a thiodipropionate synergist, etc. The neutralizing agent may be at least one selected from calcium stearate, zinc oxide, zinc stearate, etc. Also, a commonly used antistatic may be included. Persons of ordinary skill in the art may readily use these or other additives.

The above-described polypropylene compositions of the present invention may have a melt index of from 10 to 50 g/10 min, more preferably from 25 to 40 g/10 min. When the melt index is below 10 g/10 min, such appearance problems as weld line, sink, flow mark, etc. may occur. And, when it exceeds 50 g/10 min, rigidity and impact strength may be deteriorated.

The polypropylene resin compositions of the present invention can be prepared by any known methods in the art and is not limited to a particular method. For example, the polypropylene resin composition of the present invention may be prepared by mechanical mixing of the components. Specifically, commonly used mixing machines such as Banbury mixer, single screw extruder, twin screw extruder, multi-screw extruder, etc. may be used. Preferably, the mixing is performed at a temperature of from 170 to 240° C.

The polypropylene resin compositions of the present invention may be extrusion molded, blow molded, injection molded or sheet molded. Although not intending to be limiting, injection molding is preferred.

Interior materials of a vehicle molded from the polypropylene resin compositions of the present invention may be scored at the air bag portion using laser, without the need of coating process. Infrared ray at a specific wavelength (943 $cm^{-1}$) may be used to maintain the post-processing thickness uniform. Thus, the resin composition needs to transmit the infrared ray well. When the transmittance is low, the air bag may not be inflated properly or a safety problem may occur even when it does, because of a non-uniform thickness. Therefore, it is preferable to perform an air bag inflation test to check the safety problem.

EXAMPLES

The present invention will be explained in more detail with the following non-limiting examples.

Examples 1 to 4 and Comparative Examples 1 to 6

Preparation of Polypropylene Resin Compositions

Polypropylene resin compositions were prepared as shown in Table 2, using the components presented in Table 1.

TABLE 1

|  |  | Melt index (g/10 min, 230° C.) | Ethylene content (weight %) |
|---|---|---|---|
| Ethylene/propylene block copolymer | Polypropylene block copolymer[(1)] | 30 | 7 |
|  | Polypropylene block copolymer[(2)] | 12 | 7 |
| Ethylene/α-olefin copolymer rubber | Ethylene/propylene copolymer[(3)] | 50 weight % | |
|  | Ethylene/butene-1 copolymer[(4)] | 20 weight % | |
|  | Ethylene/octane-1 copolymer[(5)] | 30 weight % | |
| Styrene-based polymer rubber[(6)] | | Linear polymer, styrene content 13 weight % | |
| Polypropylene-silicone rubber master batch | Polypropylene | Average molecular weight | 37,000 |
|  |  | Melt index (g/10 min, 230° C.) | 30 |
|  | Silicone rubber | Average molecular weight | 87,000 |
|  |  | Intrinsic viscosity | 1.1 (dL/g) |
| Magnesium compound | | $Mg(OH)_2$ 30 wt % + $MgSO_4$ 70 wt %, average diameter 0.8 μm, average length 22 μm | |
| Inorganic filler | Talc (T-1) | Average particle size | 2.9 μm |
|  | Talc (T-2) | Average particle size | 7.6 μm |

[(1)]PP-1: Hiprene M560, GS Caltex
[(2)]PP-2: Hiprene M540, GS Caltex
[(3)]EPR: KEP-202P, Kumho Petrochemical
[(4)]EBR: Tafmer DF605, Mitsui
[(5)]EOR: Engage8180, Dow
[(6)]G1651, Kraton
(Average particle size was measured by laser precipitation.)

TABLE 2

|  |  | Examples | | | | | | Comparative Examples | | | | | |
|---|---|---|---|---|---|---|---|---|---|---|---|---|---|
|  |  | 1 | 2 | 3 | 4 | 5 | 6 | 1 | 2 | 3 | 4 | 5 | 6 |
| Ethylene/propylene block copolymer | PP-1 | 52 | 50 | 52 | 52 | 35 | 62 | — | 50 | 52 | 50 | 51 | 52 |
|  | PP-2 | — | — | — | — | — | — | 52 | — | — | — | — | — |
| Ethylene/α-olefin copolymer rubber | EPR | 8 | 10 | 0 | 8 | 10 | 5 | 8 | 4 | 8 | 8 | 8 | 8 |
|  | EBR | 6 | 6 | 10 | 0 | 8 | 3.5 | 6 | 3 | 6 | 6 | 2 | 4 |
|  | EOR | 4 | 6 | 8 | 10 | 5 | 2.5 | 4 | 3 | 6 | 6 | 2 | 4 |
| Styrene-based polymer rubber |  | 2 | 2 | 2 | 2 | 2 | 2 | 2 | 15 | 3 | 3 | 2 | 2 |
| Polypropylene-silicone rubber master batch |  | 3 | 3 | 3 | 3 | 6 | 6 | 3 | 2 | 3 | 2 | 3 | 3 |
| Magnesium compound |  | 5 | 3 | 5 | 5 | 6 | 6 | 5 | 3 | — | — | 15 | 5 |
| Inorganic filler | T-1 | 20 | 20 | 20 | 20 | 28 | 13 | 20 | 20 | 22 | 25 | 15 | — |
|  | T-2 | — | — | — | — | — | — | — | — | — | — | — | 20 |

Specifically, the components presented in Table 2 were mixed, while dry blending using a Hensel mixer for 3 minutes, and injection molded using a twin screw extruder (diameter 45 mmØ) set at 190° C.

Test Examples 1 to 4 and Comparative Test Examples 1 to 6

Physical Property Evaluation

Physical properties of the samples prepared in Examples and Comparative Examples were evaluated according to the methods presented in Table 3. The result is summarized in Table 8.

TABLE 3

| Test items | Measuring or evaluating methods |
|---|---|
| Melt index (MI) | Measured according to ASTM D1238 at 230° C., 2.16 kgf. |
| Flex modulus | Measured according to ASTM D790. |
| Surface status | Evaluated surface status of injection molded parts according to Table 4. |
| Scratch resistance | Scratched sample surface using a scratch ruler under the condition of Table 5 and evaluated the surface status according to Table 6. |
| Laser scoring test | Sample surface was laser scored and it was determined whether IR at 10.6 μm (943 cm$^{-1}$) is detected across a thickness of 0.1 mm (⊚: detected, X: not detected). |
| Air bag inflation test | Sample was prepared according to Table 7 and it was observed whether fragments are formed during inflation of air bag (⊚: no fragments, X: fragments formed). |

TABLE 4

| | Evaluation standard | |
|---|---|---|
| Evaluation | Appearance | |
| ⊚ | Superior. | Pass |
| ○ | Slight weld lines, sinks or flow marks are observed. | |
| Δ | Distinct weld lines, sinks or flow marks. | Fail |
| X | Severe weld lines, sinks or flow marks on the overall surface. | |

TABLE 5

| Items | Condition |
|---|---|
| Load (N or kgf) | 4.9 N or 0.5 kgf |
| Stroke (mm) | 100 ± 5 |
| Scratching speed (mm/sec) | 100 |
| Number of scratches | 1 |

TABLE 6

| | Evaluation standard | | |
|---|---|---|---|
| Rating | Scratch width (μm) | Appearance | |
| 5 | <20 | Little surface damage. | Pass |
| 4 | 100-200 | No distinct surface damage. | |
| 3 | 200-300 | Slight surface damage. | |
| 2 | 300-400 | Whitening caused by distinct surface damage. | Fail |
| 1 | >400 | Very severe surface damage. | |

TABLE 7

| Temperature (° C.) | Heat aging | Life cycle | Virgin |
|---|---|---|---|
| −30 | 3 | 3 | 3 |
| 21 | 2 | 2 | 2 |
| 85 | 3 | 3 | 3 |

Heat aging: Tested after 240 hr at 107° C., 8 hr at 21° C. (aging), and then 4 hr at the three temperatures.
Life cycle: Tested after repeating temperate change from 85° C. to −30° C. for 14 days, followed by aging at 21° C. for 8 hr.
Virgin: Tested after aging at 21° C. for 8 hr.

TABLE 8

| | Test Examples | | | | | | Comparative Test Examples | | | | | |
|---|---|---|---|---|---|---|---|---|---|---|---|---|
| | 1 | 2 | 3 | 4 | 5 | 6 | 1 | 2 | 3 | 4 | 5 | 6 |
| Melt index (MI) | 25 | 27 | 25 | 26 | 24 | 27 | 11 | 25 | 26 | 26 | 26 | 25 |
| Flex modulus | 21000 | 20000 | 21800 | 21400 | 20900 | 21950 | 21500 | 19200 | 19000 | 20000 | 23500 | 20400 |
| Surface status | ⊚ | ○ | ⊚ | ⊚ | ⊚ | ⊚ | X | ⊚ | ○ | ⊚ | ○ | ○ |
| Scratch resistance | 3.5 | 3 | 3.5 | 3.5 | 3 | 3.5 | 3.5 | 2 (X) | 2.5 (X) | 3 | 3.5 | 3 |
| Laser scoring test | ⊚ | ⊚ | ⊚ | ⊚ | ○ | ⊚ | ⊚ | X | ⊚ | ⊚ | ⊚ | ⊚ |
| Air bag inflation test | ⊚ | ⊚ | ⊚ | ⊚ | ⊚ | ⊚ | ⊚ | — | X | X | X | X |

As can be seen from Table 8, all the polypropylene resin compositions of Examples 1 to 4 exhibited superior fluidity and flex modulus, good surface status, good scratch resistance, good laser processability, and superior impact strength during air bag inflation.

In contrast, when the ethylene/propylene block copolymer having a low melt index was used (Comparative Example 1), weld lines, sinks, flow marks, etc. appeared on the surface due to poor flow property. Therefore, a product prepared therefrom may not be applicable without a coating process. And, when the content of the styrene-based polymer rubber was excessive (Comparative Example 2), physical properties, laser processability, and superior impact strength during air bag inflation were poor. When the magnesium compound was not used (Comparative Example 3), post-modification might occur due to reduced flex modulus, and appearance quality might be deteriorated due to decreased scratch resistance. Also, when the content of the inorganic filler was increased instead of omitting the magnesium compound (Comparative Example 4), when the magnesium compound was used in excess (Comparative Example 5) or when the inorganic filler having a large particle size was used (Comparative Example 6), fragments were formed during the inflation of air bag due to decrease impact properties.

As described, the polypropylene resin composition according to the present invention provides superior impact resistance and rigidity, superior fluidity, excellent laser processability and appearance quality, makes parts molding easy, and is applicable to the interior materials of a vehicle, including an air bag deployable instrument panel, without requiring a coating process, which was confirmed by Test Examples.

Even in Test Examples 5 and 6, where the compositions were significantly different from those of Test Examples 1 to 4, the compositions were shown to have superior properties applicable to interior materials of a vehicle, within the scope of the present invention.

Exemplary embodiments of the present invention have been described herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A polypropylene resin composition for interior materials of a vehicle comprising 30 to 70 weight % of an ethylene/propylene block copolymer, 10 to 30 weight % of an ethylene/α-olefin copolymer rubber, 1 to 10 weight % of a styrene-based polymer rubber, 2 to 8 weight % of a polypropylene-silicone rubber master batch, 1 to 7 weight % of a magnesium compound and 10 to 40 weight % of an inorganic filler,
   wherein the polypropylene-silicone rubber master batch comprises polypropylene resin and silicone rubber in weight ratio of 1:0.5 to 1.5.

2. The polypropylene resin composition as claimed in claim 1, wherein the ethylene/propylene block copolymer has a melt index of 20 to 50 g/10 min and an ethylene content of 3 to 20 weight %.

3. The polypropylene resin composition as claimed in claim 1, wherein the ethylene/α-olefin copolymer rubber is selected from an ethylene/propylene copolymer (EPR), an ethylene/butene-1 copolymer (EBM), an ethylene octene-1 copolymer (EOM) and a combination thereof.

4. The polypropylene resin composition as claimed in claim 1, wherein the ethylene/α-olefin copolymer rubber comprises 20 to 80 weight % of an ethylene/propylene copolymer, 12 to 25 weight % of an ethylene/butene-1 copolymer and 15 to 45 weight % of an ethylene octene-1 copolymer, based on the total weight of the ethylene/α-olefin copolymer rubber.

5. The polypropylene resin composition as claimed in claim 1, wherein the styrene-based polymer rubber is linear or non-linear and at least 97 to 99.8% of the unsaturated bonds are hydrogenated.

6. The polypropylene resin composition as claimed in claim 4, wherein the styrene-based polymer rubber comprises 10 to 50 weight % of a styrene block polymer, and 50 to 90 weight % of either a block homopolymer of a monomer selected from the group consisting of ethylene, isoprene, butylene, butadiene and propylene or a block copolymer of two or more monomers selected from the group consisting of ethylene, isoprene, butylene, butadiene and propylene.

7. The polypropylene resin composition as claimed in claim 1, wherein the polypropylene resin has an average molecular weight of 35,000 to 40,000, a melt index of 25 to 40 g/10 min (at 190° C., 2.6 kgf) and an intrinsic viscosity of 1.1 to 1.2 dL/g, and the silicone rubber is a siloxane-based silicone rubber having an average molecular weight of 80,000 to 100,000 and a specific gravity of 0.95 to 0.98.

8. The polypropylene resin composition as claimed in claim 7, wherein the silicone rubber comprises polydimethylsiloxane, at least one of methyl groups thereof being substituted with vinyl groups or phenyl groups.

9. The polypropylene resin composition as claimed in claim 8, wherein the silicone rubber comprises at least one compound selected from the group consisting of polymethylphenylsiloxane, polymethylvinylsiloxane, polydiphenylsiloxane, polydivinylsiloxane, polyphenylvinylsiloxane and a mixture thereof.

10. The polypropylene resin composition as claimed in claim 1, wherein the inorganic filler is at least one selected from the group consisting of talc, barium sulfate, calcium carbonate and wollastonite having an average particle size of 0.5 to 7 μm.

11. The polypropylene resin composition as claimed in claim 1, wherein the polypropylene resin composition has a melt index of 10 to 50 g/10 min.

12. The polypropylene resin composition as claimed in claim 1, wherein the polypropylene resin composition is formed by injection molding.

13. The polypropylene resin composition as claimed in claim 1, further comprising at least one antioxidant selected from the group consisting of a phenol-based antioxidant, a phosphate-based antioxidant and a thiodipropionate synergist.

14. The polypropylene resin composition as claimed in claim 1, wherein the polypropylene resin composition is formed by injection molding.

15. The polypropylene resin composition as claimed in claim 1, further comprising an antistatic agent.

16. A motor vehicle comprising an interior material that comprises a polypropylene resin composition of claim 1.

17. The motor vehicle of claim 16 comprising an air bag deployable instrument panel comprising the interior material that comprises the polypropylene resin composition.

* * * * *